(12) United States Patent
Xu

(10) Patent No.: US 9,706,194 B2
(45) Date of Patent: Jul. 11, 2017

(54) ELECTRONIC DEVICE AND METHOD OF CONTROLLING THE SAME

(71) Applicant: LG ELECTRONICS INC., Seoul (KR)

(72) Inventor: Rijun Xu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 234 days.

(21) Appl. No.: 14/546,529

(22) Filed: Nov. 18, 2014

(65) Prior Publication Data

US 2015/0138327 A1 May 21, 2015

(30) Foreign Application Priority Data

Nov. 18, 2013 (KR) .......................... 10-2013-0139895

(51) Int. Cl.
*H04N 13/04* (2006.01)
*G02B 27/00* (2006.01)
*G02B 27/22* (2006.01)

(52) U.S. Cl.
CPC ....... *H04N 13/047* (2013.01); *H04N 13/0402* (2013.01); *H04N 13/0404* (2013.01); *H04N 13/0409* (2013.01); *H04N 13/0452* (2013.01); *H04N 13/0454* (2013.01); *H04N 13/0468* (2013.01); *H04N 13/0497* (2013.01); *G02B 27/0093* (2013.01); *G02B 27/2214* (2013.01)

(58) Field of Classification Search
None
See application file for complete search history.

(56) References Cited

U.S. PATENT DOCUMENTS

| | | | | |
|---|---|---|---|---|
| 2008/0007511 A1* | 1/2008 | Tsuboi | .............. | G02B 27/2214 345/102 |
| 2011/0051239 A1* | 3/2011 | Daiku | ............... | G02B 27/0093 359/464 |
| 2011/0157167 A1* | 6/2011 | Bennett | .................... | G06F 3/14 345/419 |
| 2013/0031472 A1* | 1/2013 | Ueno | ................. | H04N 13/0497 715/251 |
| 2013/0222384 A1* | 8/2013 | Futterer | ................... | G02B 5/32 345/426 |
| 2014/0139427 A1* | 5/2014 | Hirai | ....................... | G06F 3/013 345/156 |
| 2014/0307063 A1* | 10/2014 | Lee | ....................... | G06T 7/2046 348/51 |
| 2015/0042658 A1* | 2/2015 | Erhard | .................... | G06T 19/00 345/427 |

(Continued)

*Primary Examiner* — Reza Aghevli

(74) *Attorney, Agent, or Firm* — KED & Associates LLP

(57) ABSTRACT

Disclosed herein are an electronic device and a method of controlling the same. The electronic device may include a sensor configured to detect the location of at least one viewer, a display configured to generate a 3D image and generate at least one 3D-visible area where a 3D image is able to be recognized and at least one 3D-invisible area where a 3D image is unable to be recognized, and a control unit configured to change a display state of a 3D image if the detected at least one viewer is placed in the 3D-invisible area. In accordance with the present invention, a viewer may smoothly view an image because the display state of a 3D image is changed if the viewer is placed in a 3D-invisible area.

19 Claims, 21 Drawing Sheets

(56) References Cited

U.S. PATENT DOCUMENTS

2015/0076125 A1* 3/2015 Toyosawa ................ B01J 19/12
                                                            219/121.73
2015/0085110 A1* 3/2015 Pettersson ............... G01S 17/06
                                                            348/140

* cited by examiner

FIG. 11
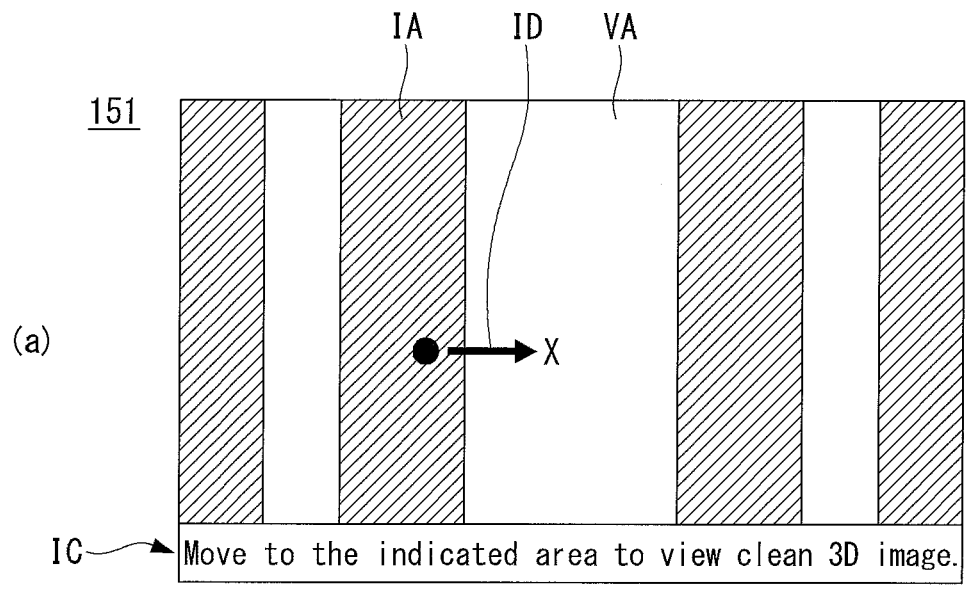
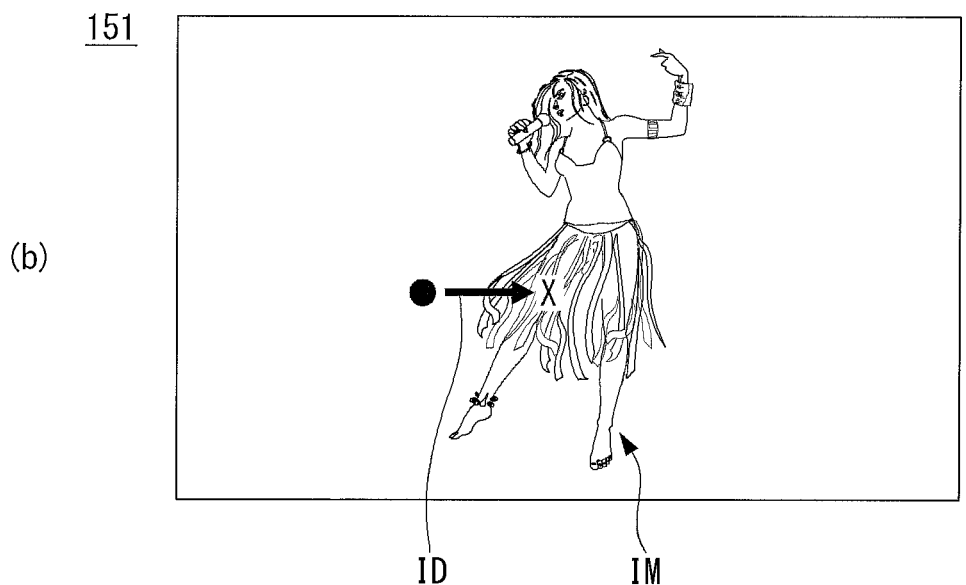

ELECTRONIC DEVICE AND METHOD OF CONTROLLING THE SAME

CROSS-REFERENCE TO RELATED APPLICATION(S)

Pursuant to 35 U.S.C. §119(a), this application claims the benefit of earlier filing date and right of priority to Korean Patent Application No. 10-2013-0139895, filed on Nov. 11, 2013, the contents of which are incorporated by reference herein in their entirety.

BACKGROUND

1. Field

The present invention relates to an electronic device and a method of controlling the same and, more particularly, to an electronic device and a method of controlling the same, which enable a viewer to smoothly view an image by changing the display state of a 3D image if the viewer is placed in a 3D-invisible area.

2. Background

As the functionality of an electronic device, such as TV, a personal computer, a laptop computer, or a mobile phone, is diversified, the electronic device has been implemented in the form of a multimedia player having complex functions, such as the photographing of images and video, the playback of music and video files, gaming, and the reception of broadcasting.

An electronic device may be divided into a mobile terminal and a stationary terminal depending on whether it is movable. The mobile terminal may be divided into a handheld terminal and a vehicle mount terminal depending on whether it is able to be directly carried on by a user.

In order to support and increase the functionality of the electronic device, improving structural and/or software parts of the electronic device may be taken into consideration.

SUMMARY OF THE INVENTION

An object of the present invention is to provide an electronic device and a method of controlling the same, which enable a viewer to smoothly view an image by changing the display state of a 3D image if the viewer is placed in a 3D-invisible area.

In an embodiment, an electronic device may include a sensor configured to detect the location of at least one viewer, a display configured to generate a 3D image and generate at least one 3D-visible area where a 3D image is able to be recognized and at least one 3D-invisible area where a 3D image is unable to be recognized, and a control unit configured to change the display state of a 3D image if the detected at least one viewer is placed in the 3D-invisible area.

The control unit may be further configured to display, on the display, at least one indicator indicative of at least one of the location of the at least one viewer, the location of the at least one 3D-visible area, and a direction along which the at least one viewer is to move to the at least one 3D-visible area so that the display state of the 3D image is changed.

The control unit may be further configured to superimpose the at least one indicator on the 3D image and to display the superimposed indicator and 3D image.

The control unit may be further configured to generate a 2D image corresponding to the location of a viewer who belongs to the at least one viewer and who is placed in the 3D-invisible area so that the display state of the 3D image is changed.

The control unit may be further configured to generate at least one 2D image, corresponding to the location of the at least one viewer, from the 3D image.

The control unit may be further configured to display the generated 2D image in the 3D-invisible area and to display the 3D image in the 3D-visible area.

The control unit may be further configured to generate a 2D image from the 3D image based on information about the depth of the 3D image and to display the generated 2D image.

The control unit may be further configured to generate the 2D image if a 3D effect of the 3D image is smaller than a reference value based on the depth information.

The control unit may be further configured to change the display state of the 3D image based on information about the at least one viewer.

The information about the at least one viewer may include information about an age of the at least one viewer. The control unit may be further configured to change attributes of the 3D image based on the information about the age of the at least one viewer.

The sensor may include a camera configured to capture an external image. The control unit may be further configured to obtain an image of the at least one viewer from the external image captured by the camera.

In another embodiment, an electronic device may include a sensor configured to detect at least one viewer, a display configured to generate a 3D image and generate at least one 3D-visible area where a 3D image is able to be recognized and at least one 3D-invisible area where a 3D image is unable to be recognized, and a control unit configured to display at least one indicator that guides at least one of the at least one viewer to the 3D-visible area if the detected at least one viewer is placed in the 3D-invisible area.

The control unit may be further configured to generate a 2D image corresponding to the location of a viewer who belongs to the at least one viewer and who is placed in the 3D-invisible area so that the display state of the 3D image is changed.

The control unit may be further configured to generate a 2D image from the 3D image based on information about the depth of the 3D image and to display the generated 2D image.

The control unit may be further configured to change the display state of the 3D image based on information about the at least one viewer.

In yet another embodiment, a method of controlling an electronic device may include displaying a 3D image comprising at least one 3D-visible area where a 3D image is able to be recognized and at least one 3D-invisible area where a 3D image is unable to be recognized, detecting the location of at least one viewer, and changing the display state of the 3D image if the detected at least one viewer is placed in the 3D-invisible area.

Changing the display state of the 3D image may include displaying, on the display, at least one indicator indicative of at least one of the location of the at least one viewer, the location of the at least one 3D-visible area, and a direction along which the at least one viewer is to move to the at least one 3D-visible area so that the display state of the 3D image is changed Changing the display state of the 3D image may include generating a 2D image corresponding to the location of a viewer who belongs to the at least one viewer and who is placed in the 3D-invisible area so that the display state of the 3D image is changed.

Changing the display state of the 3D image may include generating a 2D image from the 3D image based on information about the depth of the 3D image and to displaying the generated 2D image.

Changing the display state of the 3D image may include changing the display state of the 3D image based on information about the at least one viewer.

BRIEF DESCRIPTION OF THE DRAWINGS

The embodiments will be described in detail with reference to the following drawings in which like reference numerals refer to like elements wherein:

FIG. 11 is a diagram illustrating a process of guiding the electronic device to a 3D-visible area in the method of FIG. 8;

DETAILED DESCRIPTION

Figure 1:
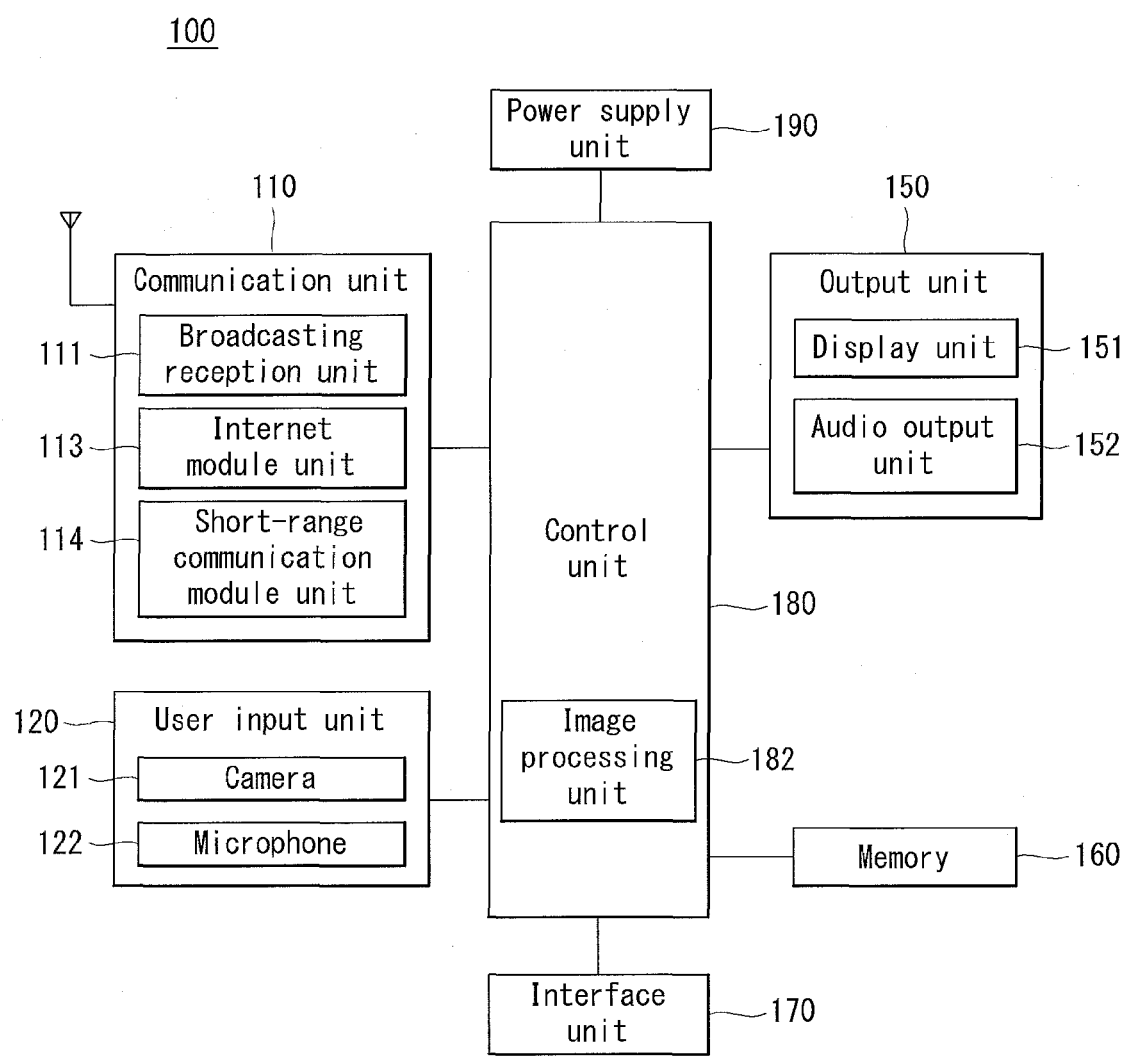
FIG. 1 is a block diagram of an electronic device according to an embodiment of the present invention.

The above object, characteristics, and merits of the present invention will become more apparent from the following detailed description taken in conjunction with the accompanying drawings. However, the present invention may be modified in various ways, and may have several embodiments. Accordingly, only specific embodiments are illustrated in the drawings and are described in detail. In principle, the same reference numerals denote the same elements throughout the drawings. Furthermore, detailed descriptions of the known functions or constructions are omitted if they are deemed to make the gist of the present invention unnecessarily vague. Furthermore, numbers (e.g., the first and the second) used in the description of this specification are merely identification symbols for differentiating one element from another element.

An electronic device related to the present invention is described in detail below with reference to the accompanying drawings. In the following description, suffixes "module" and "unit" may be given to components of the electronic device with consideration taken of only facilitation of description, and do not have meanings or functions discriminated from each other.

The electronic device described in this specification may include a mobile phone, a smart phone, a laptop computer, a digital broadcasting terminal, personal digital assistants (PDA), a portable multimedia player (PMP), a navigation system and/or so on. However, those skilled in the art will easily understand that elements according to an embodiment described in this specification may also be applied to a stationary terminal, such as digital TV and a desktop computer, in addition to a mobile terminal.

FIG. 1 is a block diagram of an electronic device according to an embodiment of the present invention.

As illustrated in FIG. 1, the electronic device 100 according to an embodiment of the present invention may include a communication unit 110, a user input unit 120, an output unit 150, memory 160, an interface unit 170, a control unit 180, and a power supply unit 190. The elements illustrated in FIG. 1 enumerate only elements that may be typically included in the electronic device 100. Accordingly, it is to be noted that the electronic device 100 having elements greater or fewer than the illustrated elements may alternatively be implemented.

The communication unit 110 may include at least one module that enables communication between the electronic device 100 and a communication system or between the electronic device 100 and another device. For example, the communication unit 110 may include a broadcasting reception unit 111, an Internet module unit 113, and a short-range communication module unit 114.

The broadcasting reception unit 111 may receive broadcasting signals and/or broadcasting-related information from an external broadcasting management server through a broadcasting channel.

The broadcasting channel may include a satellite channel and a terrestrial channel. The broadcasting management server may be a server configured to generate and send broadcasting signals and/or broadcasting-related information or a server configured to receive previously generated broadcasting signals and/or broadcasting-related information and send the broadcasting signals and/or broadcasting-related information to a terminal. The broadcasting signals may include not only TV broadcasting signals, radio broadcasting signals, and data broadcasting signals, but also signals having combinations of TV broadcasting signals or radio broadcasting signals and radio broadcasting signals.

The broadcasting-related information may be information on a broadcasting channel, a broadcasting program, or a broadcasting service provider. The broadcasting-related information may be provided even over a communication network.

The broadcasting-related information may be present in various forms. For example, the broadcasting-related information may be present in the form of an electronic program guide (EPG) of digital multimedia broadcasting (DMB) or in the form of an electronic service guide (ESG) of digital video broadcast-handheld (DVB-H).

The broadcasting reception unit 111 may receive broadcasting signals using various broadcasting systems. Broadcasting signals and/or broadcasting-related information received through the broadcasting reception unit 111 may be stored in the memory 160.

The Internet module unit 113 may correspond to a module for Internet access. The Internet module unit 113 may be embedded in the electronic device 100 or may be provided separately from the electronic device 100.

The short-range communication module unit 114 may correspond to a module for short-range communication. Bluetooth, radio frequency identification (RFID), infrared data association (IrDA), ultra wideband (UWB) and/or ZigBee may be used as a short-range communication technique.

The user input unit 120 is for receiving audio signals or video signals, and may include a camera 121 and a microphone 122.

The camera 121 may process image frames of still images or moving images obtained by an image sensor in video telephony mode or photographing mode. The processed image frames may be displayed on a display unit 151. The camera 121 may be capable of 2D or 3D photographing, and may be a 2D or 3D camera or a combination of 2D and 3D cameras.

Image frames processed by the camera 121 may be stored in the memory 160 or may be transmitted to an external device through the communication unit 110. The electronic device 100 may include at least two cameras 121 depending on its configuration.

The microphone 122 may receive an external audio signal in call mode, recording mode, or speech recognition mode, and may process the received audio signal into electric audio data. The microphone 122 may use various noise removal algorithms for removing noise generated when receiving an external audio signal.

The output unit 150 may include the display unit 151 and an audio output unit 152.

The display unit 151 displays information processed by the electronic device 100. For example, the display unit 151 may display a user interface (UI) and/or a graphic user interface (GUI) related to the electronic device 100. The display unit 151 may include at least one of a liquid crystal display, a thin film transistor liquid crystal display, an organic light-emitting diode display, a flexible display and/or a three-dimensional (3D) display. The display unit 151 may be of a transparent type or a light transmissive type. That is, the display unit 151 may be called a transparent display. A representative example of the transparent display is a transparent LCD. A rear structure of the display unit 151 may also be of a light transmissive type. Accordingly, a user may see an object located behind the body of the electronic device 100 through an area of the body of the electronic device 100 that is occupied by the display unit 151.

The electronic device 100 may include at least two display units 151 depending on its implementation form. For example, the electronic device 100 may include a plurality of display units 151 that are arranged on a single face at specific intervals or are integrated. The plurality of display units 151 may also be arranged on different sides.

If the display unit 151 and a sensor configured to detect a touch operation (hereafter referred to as a "touch sensor") form a layered structure (hereinafter abbreviated as a "touch screen"), the display unit 151 may be used as an input device in addition to an output device. The touch sensor may be in the form of a touch film, a touch sheet, or a touch pad, for example.

The touch sensor may be configured to convert a variation in pressure applied to a specific portion of the display unit 151 or a variation in capacitance generated from a specific portion of the display unit 151 into an electric input signal. The touch sensor may be configured to detect pressure when a touch is performed in addition to a touched position and area.

When a touch is inputted to the touch sensor, a signal corresponding to the touch input is transmitted to a touch control unit. The touch control unit processes the signal and sends data corresponding to the processed signal to the control unit 180. Accordingly, the control unit 180 may detect a touched portion of the display unit 151.

The audio output unit 152 may output audio data received from the communication unit 110 or stored in the memory 160. The audio output unit 152 may output audio signals related to functions (e.g., a call signal incoming tone and a message incoming tone) performed in the electronic device 100. The audio output unit 152 may include a receiver, a speaker, and a buzzer.

The memory 160 may store programs for the operations of the control unit 180, and may temporarily store input/output data (e.g., a phone book, messages, still images, and moving images). The memory 160 may store data regarding vibrations and sounds in various patterns that are output when a touch input is applied to a touch screen.

The memory 160 may include at least of flash type memory, hard disk type memory, a multimedia card micro type, card type memory (e.g., SD or XD memory), random access memory (RAM), static RAM (SRAM), read-only memory (ROM), electrically erasable programmable ROM (EEPROM), programmable ROM (PROM) magnetic memory, a magnetic disk and an optical disk. The electronic device 100 may also operate in relation to a web storage that performs the storing function of the memory 160 on the Internet.

The interface unit 170 may serve as a path to all external devices connected to the electronic device 100. The interface unit 170 may receive data or power from the external devices and send the data or power to the internal elements of the electronic device 100, or may send data of the electronic device 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The control unit 180 may control overall operations of the electronic device 100. For example, the control unit 180 may perform control and processing for voice communication, data communication and video telephony. The control unit 180 may include an image processing unit 182 for image processing. The image processing unit 182 is described in more detail in relation to a corresponding portion.

The power supply unit 190 is supplied with external power and/or internal power, and supplies power for the operations of the elements under the control of the control unit 180.

For example, various embodiments described herein may be implemented in software or hardware or a recording medium readable by a computer or a similar device using a combination of the software and the hardware. According to hardware implementations, embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units configured to execute functions. In some cases, the embodiments may be implemented by the control unit 180.

According to software implementations, embodiments, such as procedures or functions, may be implemented with a separate software module that executes at least one function or operation. Software code may be implemented by a software application written in an appropriate software language. Furthermore, the software code may be stored in the memory 160 and executed by the control unit 180.

FIGS. 2 to 7 are diagrams illustrating a method of displaying a stereoscopic image using a binocular parallax, which are related embodiments of the present invention.

A binocular parallax (or stereo disparity) means a difference in an angle of vision of a thing that is seen by the left eye and right eye of a person. If an image seen by the left eye and an image seen by the right eye are composed in the brain of a person, the composed image makes the person have a stereoscopic feeling. Hereinafter, a phenomenon in which a person has a stereoscopic feeling according to a binocular parallax is called a "stereoscopic vision", and an image that generates the stereoscopic vision is called a "stereoscopic image". Furthermore, if a specific object included in an image generates a stereoscopic vision, the specific object is called a "stereoscopic object".

A method of displaying a stereoscopic image according to a binocular parallax may be divided into a glasses type that requires special glasses and a non-glasses type that does not require glasses. The glasses type may include a method using dark glasses having wavelength selectivity, a polarized glasses method using a light-shielding effect according to a polarization difference, and a time-division glasses method of presenting left and right images within an afterimage time of an eye without change. The glasses type may further include a method of obtaining a stereoscopic feeling for movements in the left and right directions depending on the time difference of a visual system that is attributable to a difference in the transmittance between filters of different transmittances that are mounted on the left and right eyes.

Furthermore, the non-glasses type, that is, a method of generating a stereoscopic feeling from an image display surface not from an observer, may include a parallax barrier method, a lenticular lens method, and a microlens array method.

Figure 2:
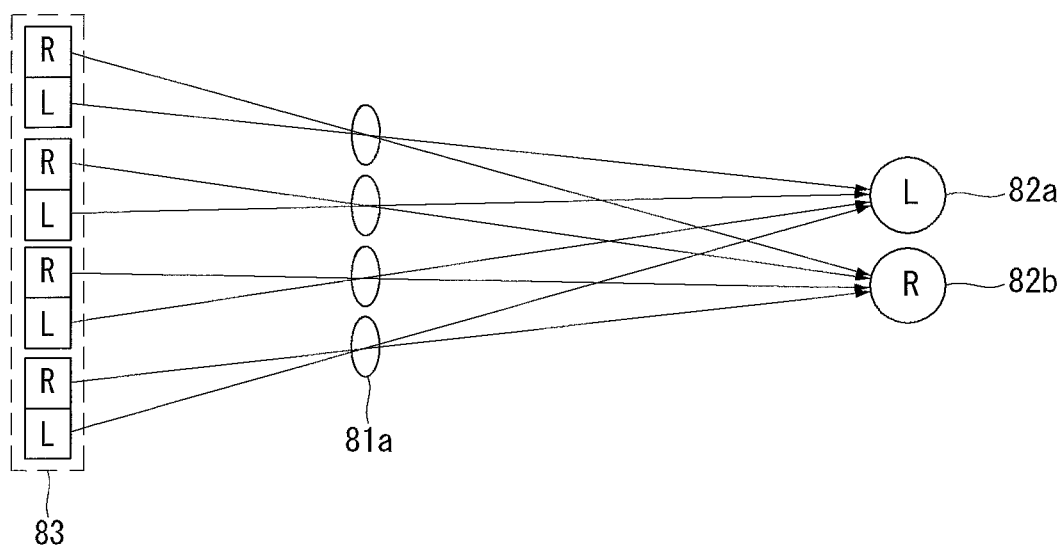
FIGS. 2 to 7 are diagrams illustrating a method of displaying a stereoscopic image using a binocular parallax, which are related embodiments of the present invention.

Referring to FIG. 2, the display unit 151 includes a lenticular lens array 81a in order to display a stereoscopic image. The lenticular lens array 81a is placed between left and right eyes 82a and 82b and a display surface 83 in which pixels L to be input to the left eye 82a and pixels R to be input to the right eye 82b are alternately arranged in a horizontal direction. The lenticular lens array 81a provides optical determination directivity for the pixels L to be provided to the left eye 82a and the pixels R to be input to the right eye 82b. Accordingly, an image that passes through the lenticular lens array 81a is separated and viewed in the left eye 82a and the right eye 82a. The brain of a person composes the image seen through the left eye 82a and the image seen through the right eye 82b and views a stereoscopic image.

Figure 3:
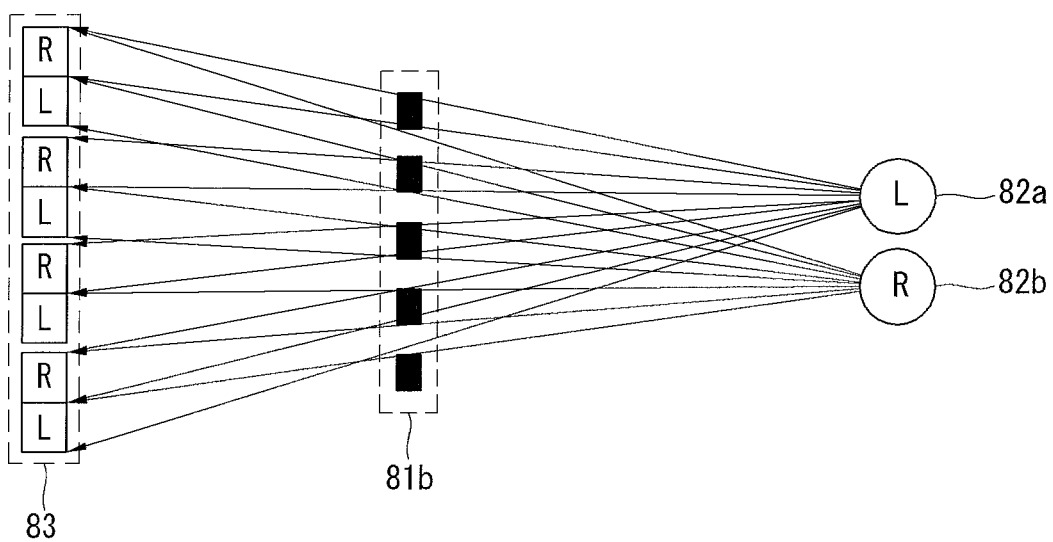

Referring to FIG. 3, the display unit 151 includes a parallax barrier 81b configured to have a vertical lattice shape and to display a stereoscopic image. The parallax barrier 81b is placed between left and right eyes 82a and 82b and a display surface 83 in which pixels L to be input to the left eye 82a and pixels R to be input to the right eye 82b are alternately arranged in a horizontal direction. The parallax barrier 81b enables an image to be separated in the left eye 82a and the right eye 82b through an aperture of a vertical lattice shape and to be viewed. Accordingly, the brain of a person composes the image seen through the left eye 82a and the image seen through the right eye 82b and views a stereoscopic image. Only when a stereoscopic image is to be displayed, the parallax barrier 81b may become on and separate an incident angle of vision. If a planar image is to be displayed, the parallax barrier 81b may become off and transmit an incident angle of vision without separating the incident angle of vision.

The aforementioned methods of displaying a stereoscopic image are for illustrating embodiments of the present invention, and the present invention is not limited to the methods.

The present invention may display a stereoscopic image using a binocular parallax using various methods in addition to the aforementioned methods.

Figure 4:
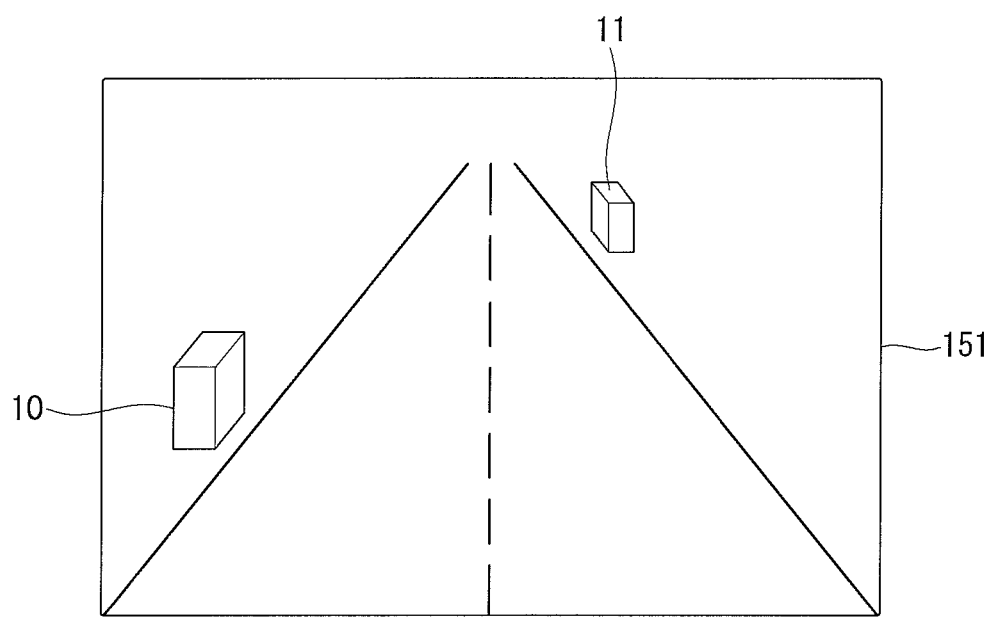

FIG. 4 illustrates an example in which a stereoscopic image including a plurality of image objects 10 and 11 is displayed.

For example, the stereoscopic image of FIG. 4 may be an image obtained through the camera 121. The stereoscopic image includes a first image object 10 and a second image object 11. The two image objects 10 and 11 have been assumed, for convenience of description, but greater image objects may be included in the stereoscopic image.

The control unit 180 may display an image, obtained through the camera 121 in real time, on the display unit 151 in a camera preview form.

The control unit 180 may obtain one or more stereo disparities corresponding to the respective one or more image objects.

If the camera 121 is a 3D camera capable of obtaining a left eye image and a right eye image, the control unit 180 may obtain the stereo disparities of the respective first image object 10 and second image object 11 through the left eye image and the right eye image obtained through the camera 121.

Figure 5:
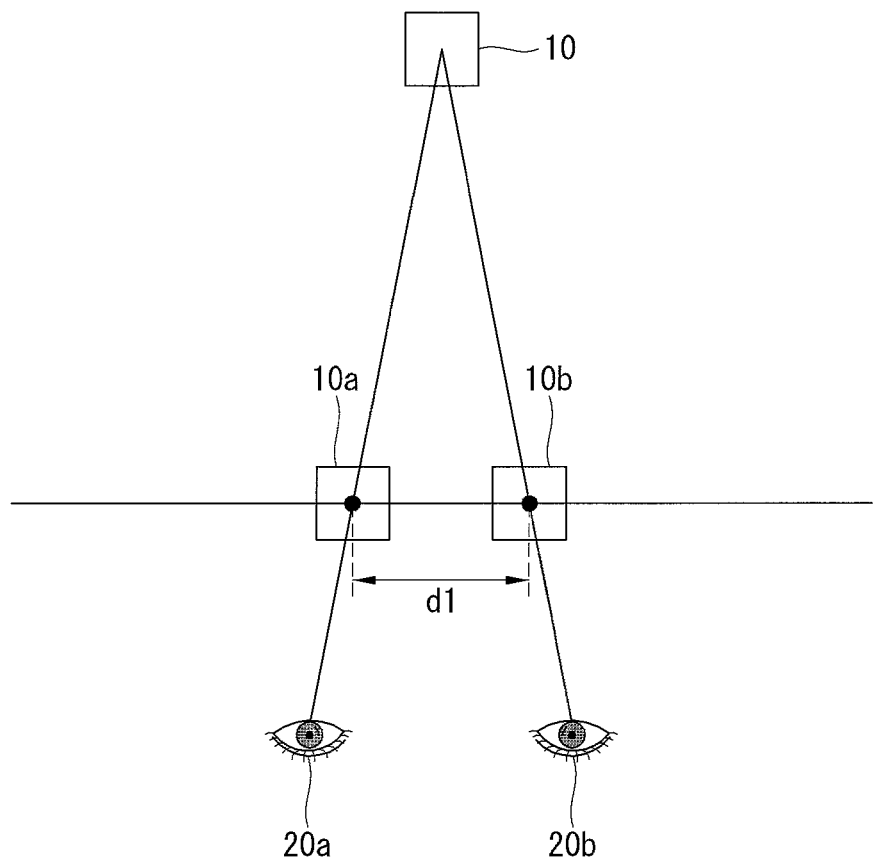

FIG. 5 is a diagram illustrating the stereo disparity of an image object included in a stereoscopic image.

For example, referring to FIG. 5, the first image object 10 may include a left eye image 10a seen by the left eye 20a of a user and a right eye image 10b seen by the right eye 20b of the user.

The control unit 180 may obtain a stereo disparity d1, corresponding to the first image object 10, through the left eye image 10a and the right eye image 10b.

If the camera 121 is a 2D camera, the control unit 180 may convert a 2D image, obtained through the camera 121, into a stereoscopic image using a specific image conversation algorithm for converting a 2D image into a 3D image, and may display the stereoscopic image on the display unit 151.

Furthermore, the control unit 180 may obtain the stereo disparity of the first image object 10 and the stereo disparity of the second image object 11 using a left eye image and a right eye image generated using the image conversation algorithm.

Figure 6:
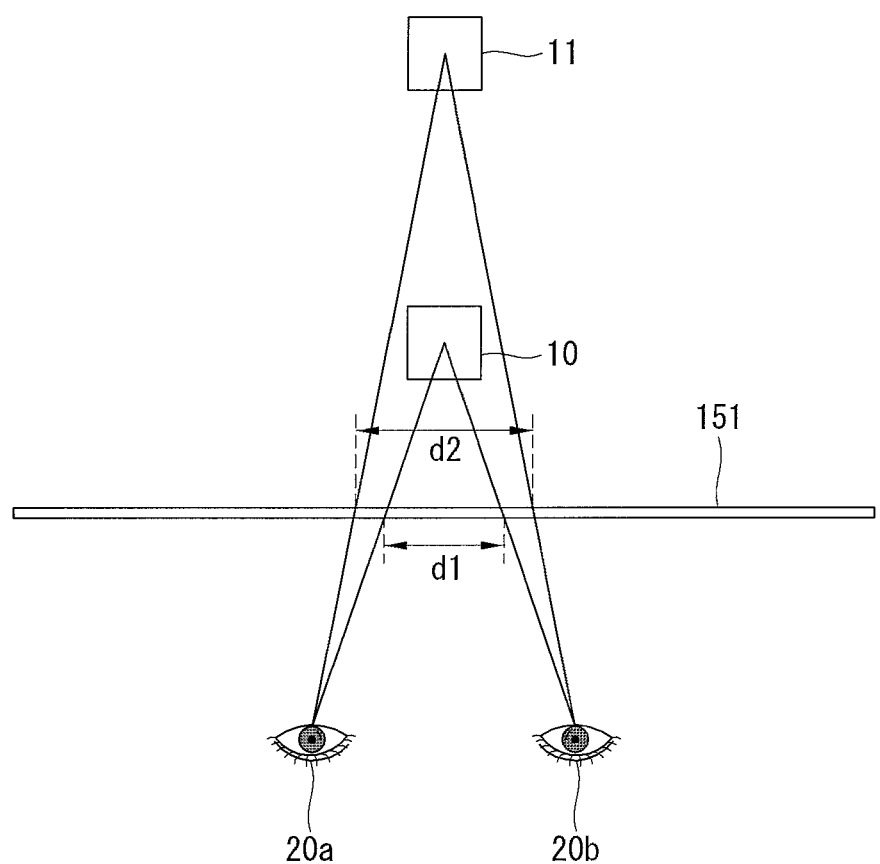

FIG. 6 is a diagram illustrating a comparison between the stereo disparities of the image objects 10 and 11 illustrated in FIG. 4.

Referring to FIG. 6, the stereo disparity d1 of the first image object 10 is different from the stereo disparity d2 of the second image object 11. Furthermore, as illustrated in FIG. 6, the second image object 11 is seen by a user as if it seems to be more distant than the first image object 10 because the stereo disparity d2 is greater than the stereo disparity d1.

The control unit 180 may obtain at least one graphic object corresponding to the at least one image object. Furthermore, the control unit 180 may display the obtained at least one graphic object on the display unit 151 so that the at least one graphic object has a corresponding stereo disparity.

Figure 7:
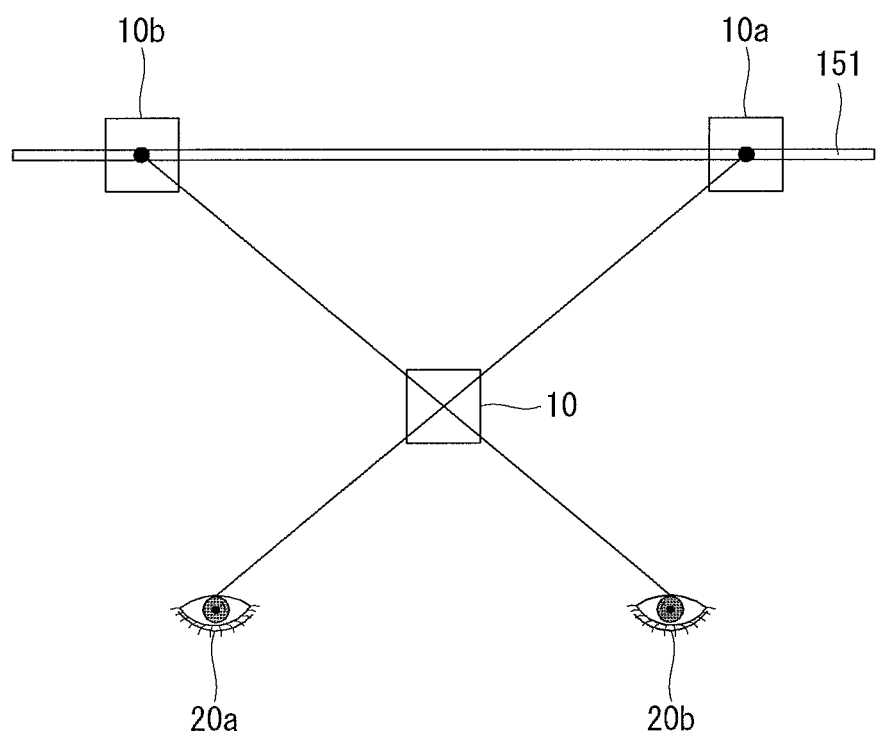

FIG. 7 illustrates the first image object 10 that may have an effect as if the first image object 10 is protruded toward a user in the display unit 151. As illustrated in FIG. 7, the locations of the left eye image 10a and the right eye image 10b on the display unit 151 may be contrary to those of FIG. 5. If the locations of the left eye image 10a and the right eye image 10b are reversed and displayed, images in opposite directions may be seen by the left eye 20a and the right eye 20*b*. Accordingly, the user may feel that the first image object 10 seems to be displayed in front of the display unit 151, that is, a point where lines of sight cross each other. That is, the user may have a positive (+) depth feeling for the display unit 151. This is similar to the case of FIG. 5 where a user has a negative (−) depth feeling as if the first image object 10 is displayed at the back compared to the display unit 151.

The control unit 180 may display a stereoscopic image so that a user has a positive or negative depth feeling, if necessary. In this case, the user may have various depth feelings.

Figure 8:
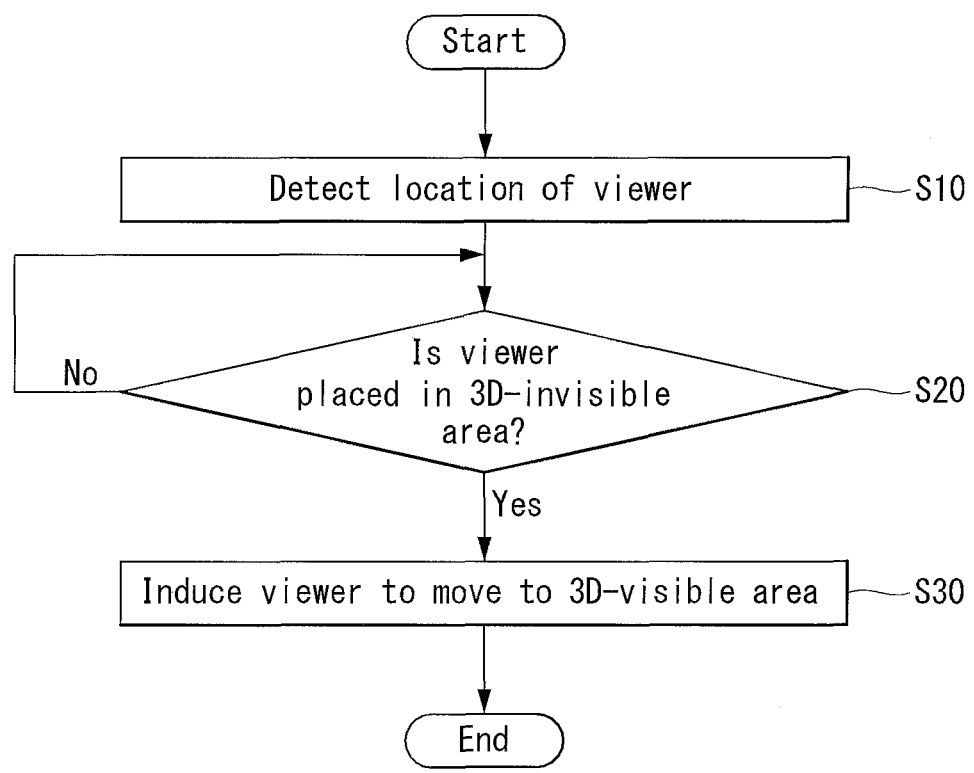
FIG. 8 is a flowchart illustrating an operation of the electronic device of FIG. 1.

FIG. 8 is a flowchart illustrating the operation of the electronic device of FIG. 1.

As illustrated in FIG. 8, the control unit 180 of the electronic device 100 according to an embodiment of the present invention may detect the location of a viewer at step S10.

This means that the electronic device 100 is able to analyze an image of a person included in an image in front of the electronic device 100 that has been captured by the camera 121.

The control unit 180 may determine whether or not a person is a person who views the electronic device 100 through image analysis. For example, if a person does not gaze steadily at the electronic device 100 although the person is within a range in which the person is able to view the electronic device 100, the control unit 180 may determine that the person is not a viewer. If the person is determined to be not a viewer, the control unit 180 may not perform additional operations on the person.

The control unit 180 may detect the location of a viewer by analyzing an image of the viewer. For example, this means that the control unit 180 is able to detect the distance between the electronic device 100 and the viewer and an angle of the viewer based on the front direction of the electronic device 100.

The location of the viewer may be detected using other means. For example, this means that whether or not the viewer is present, distance, an angle, etc. can be measured through ultrasonic wave or an infrared sensor.

When the location of the viewer is detected, the control unit 180 may determine whether or not the viewer is located in a 3D-invisible area at step S20.

The electronic device 100 may be a device configured to display a 3D image. That is, when an image is displayed on the display unit 151 of the electronic device 100, it means that a user may have a stereoscopic feeling. The display unit 151 of the electronic device 100 capable of displaying a 3D image may generate a 3D-visible area where a 3D image is able to be recognized and a 3D-invisible area where a 3D image is unable to be recognized or that has a low 3D effect based on characteristics unique to the display unit 151.

The 3D-visible area and the 3D-invisible area may be affected by the distance between the display unit 151 and a viewer, the center point of the display unit 151, an angle of a viewer, etc. For example, a 3D image may be clearly displayed in an area of a specific range from the display unit 151. If the range is exceeded, however, the 3D image may be unclearly displayed. The 3D-visible area and the 3D-invisible area are described in detail later with respect to a corresponding part.

If, as a result of the determination, the viewer is determined to be placed in the 3D-invisible area, the viewer may be guided to a 3D-visible area at step S30.

If the electronic device 100 is capable of displaying a 3D image, the viewer may preferably be located in the 3D-visible area in order to view an optimized 3D image.

The control unit 180 may induce the viewer to move to the 3D-visible area based on information about the detected location of the viewer and the 3D-visible area. For example, if the viewer is placed in the 3D-invisible area, the control unit 180 may display an indicator so that the viewer is induced to move to the 3D-visible area.

Figure 9:
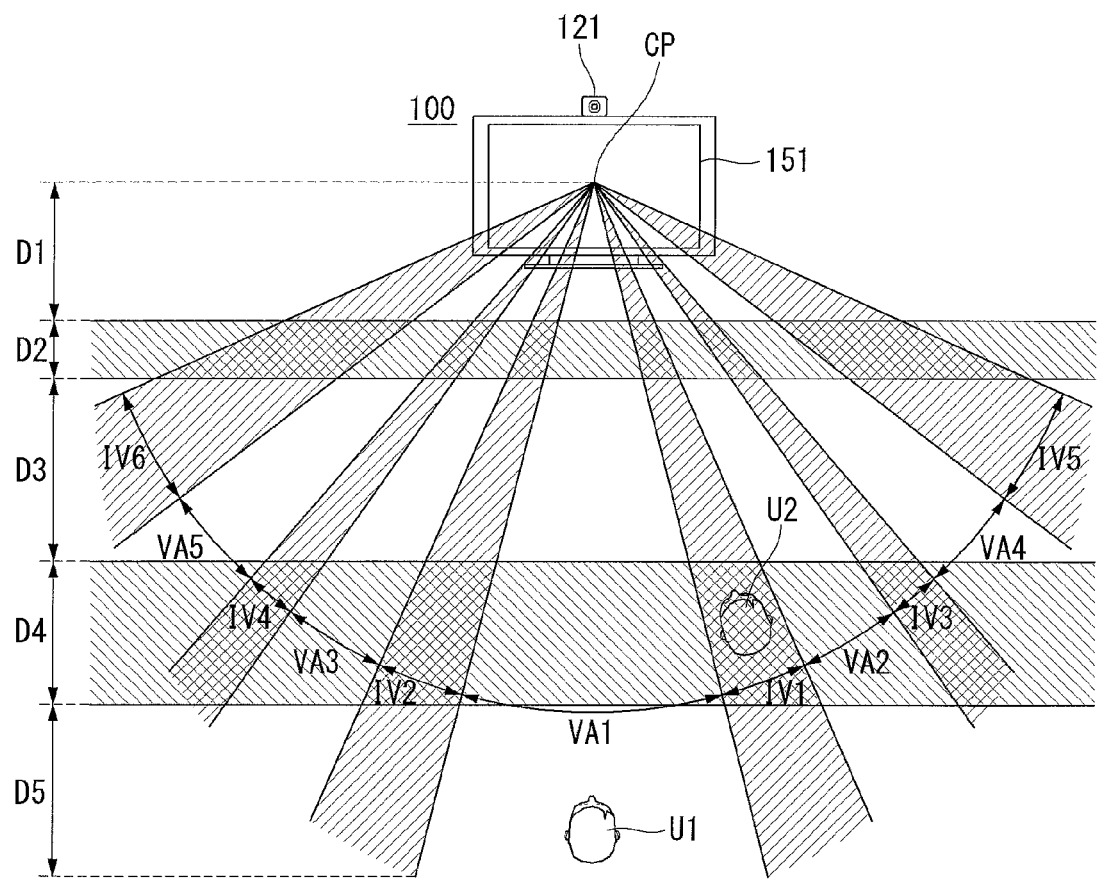
FIG. 9 is a diagram illustrating the 3D-visible area and 3D-invisible area of the electronic device of FIG. 1.

FIG. 9 is a diagram illustrating the 3D-visible area and 3D-invisible area of the electronic device 100 of FIG. 1.

As illustrated in FIG. 9, the electronic device 100 according to an embodiment of the present invention may generate a 3D-visible area and a 3D-invisible area based on characteristics unique to the display unit 151.

The 3D-visible area and the 3D-invisible area may be determined by the distance between the display unit 151 and a viewer and/or an angle based on a specific point of the display unit 151. For example, in the display unit 151, an interval D1, an interval D3, and an interval D5 may be 3D-invisible areas, but an interval D2 and an interval D4 may be 3D-visible areas. Furthermore, an interval VA1, an interval VA2, an interval VA3, an interval VA4, and an interval VA5 may be 3D-visible areas, but an interval IV1, an interval IV2, an interval IV3, an interval IV4, an interval IV5, and an interval IV6 may be 3D-invisible area on the basis of the center point CP of the display unit 151. The final determination of a 3D-visible area and a 3D-invisible area may be made based on a combination of the 3D-visible area and the 3D-invisible area according to distance and an angle. For example, a first viewer U1 distant from the display unit 151 is placed in a 3D-visible area, but a second viewer U2 close to the display unit 151 may be placed in a 3D-invisible area according to circumstances.

Figure 10:
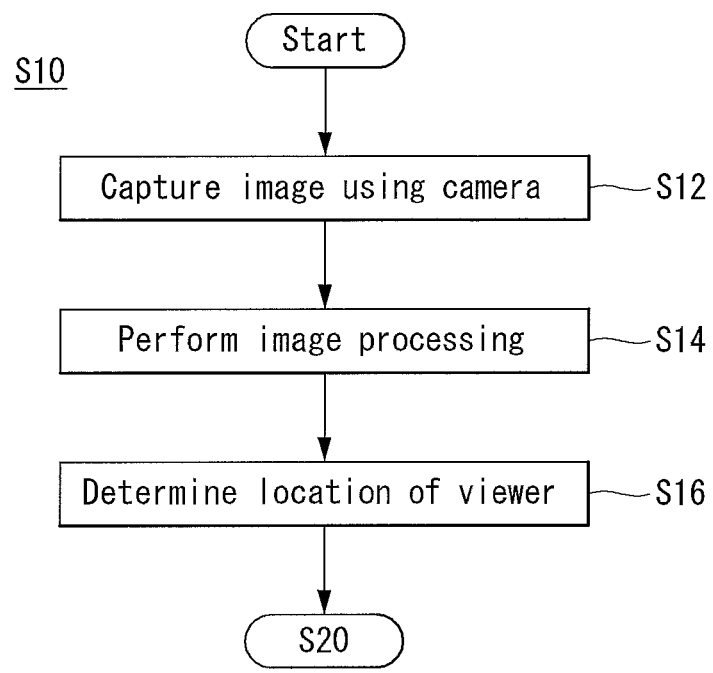
FIG. 10 is a flowchart illustrating detailed steps of detecting the location of a viewer in the method of FIG. 8.

FIG. 10 is a flowchart illustrating detailed steps of detecting the location of a viewer in the method of FIG. 8.

As illustrated in FIG. 10, the control unit 180 of the electronic device 100 according to an embodiment of the present invention may perform a detailed process in order to detect the location of a viewer.

The control unit 180 may capture an image of a viewer using the camera 121 in order to detect the location of the viewer at step S12.

The control unit 180 may perform image processing on the image captured by the camera 121 at step S14. The image processing may include a process of extracting an image of the person from the captured image. The image processing may include a process of determining whether the person is a person who watches the electronic device 100.

The control unit 180 may determine the location of the viewer at step S16.

The location of the viewer may include distance and/or an angle from the display unit 151. The location of the viewer may be determined based on the captured image. The location of the viewer may be determined using a method other than image processing using the camera 121, such as an ultrasonic sensor or an infrared sensor.

FIG. 11 is a diagram illustrating a process of guiding the electronic device to a 3D-visible area in the method FIG. 8.

As illustrated in FIG. 11, the control unit 180 of the electronic device 100 according to an embodiment of the present invention may display an indicator that induces a viewer to move to a 3D-visible area where a 3D image can be clearly viewed.

As illustrated in FIG. 11(*a*), the control unit 180 may display an indicator ID. The indicator ID may include the current location of the viewer and/or a location to which the viewer needs to move. The indicator ID may include a visible area indication VA and an invisible area indication IA. For example, the control unit 180 may notify the viewer that the viewer is now placed in the 3D-invisible area by displaying a shape indicative of the viewer within the invisible area indication IA.

The control unit 180 may represent how much does the viewer within the 3D-invisible area need to move in which direction how much. For example, it may mean that the viewer is able to view a sharp 3D image when the viewer moves in which direction to some degree.

The control unit 180 may display a comment IC that provides notification of a meaning indicated by the indicator ID. For example, this means that the comment IC having the meaning that a 3D image can be more clearly seen if the viewer moves in the direction of the indicator ID may be displayed.

As illustrated in FIG. 11(b), the control unit 180 may superimpose the indicator ID on a 3D image IM and display them. That is, this means that the indicator ID may be displayed within the limit of minimum hindrance in viewing the 3D image IM.

Figure 12:
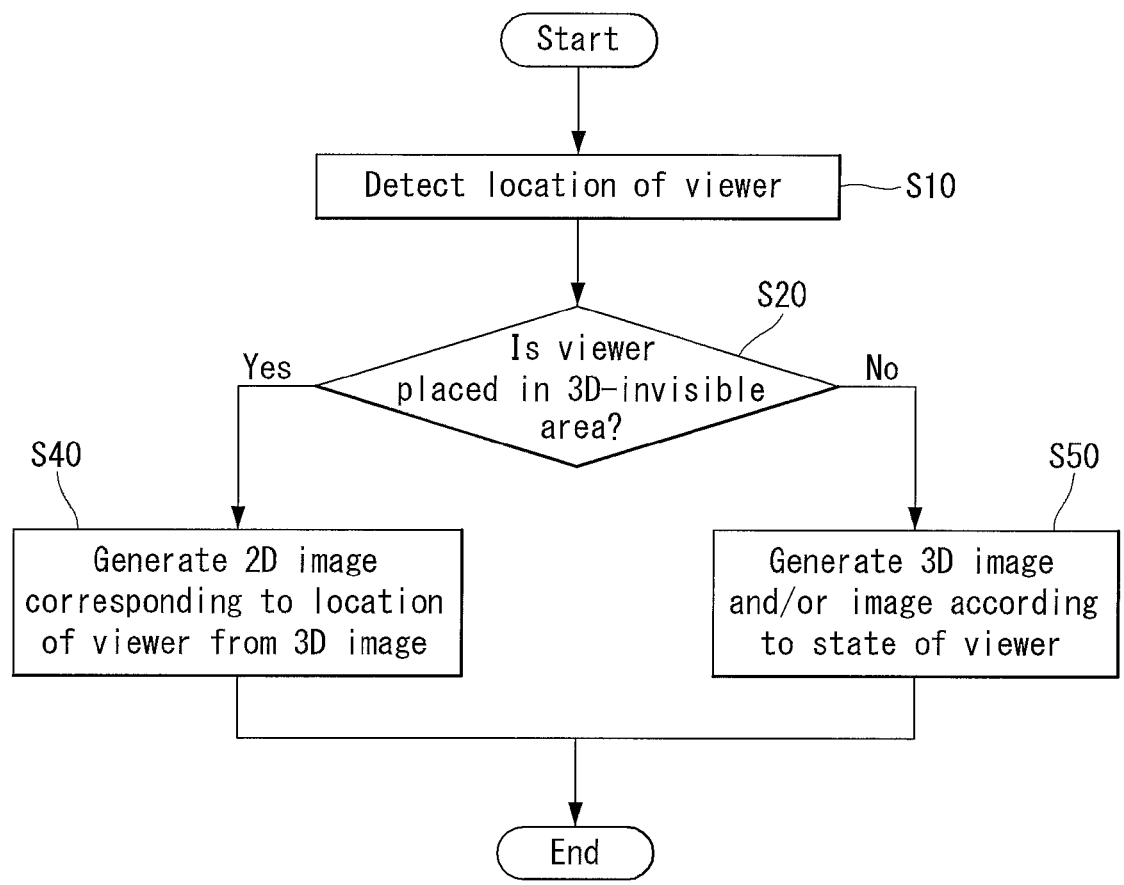
FIG. 12 is a flowchart illustrating an operation of the electronic device according to another embodiment of the present invention.

FIG. 12 is a flowchart illustrating an operation of the electronic device according to another embodiment of the present invention.

As illustrated in FIG. 12, the control unit 180 of the electronic device 100 according to another embodiment of the present invention may detect the location of a viewer at step S10 and determine whether or not the viewer is placed in a 3D-invisible area at step S20.

If, as a result of the determination, the viewer is determined to be placed in the 3D-invisible area, the control unit 180 may generate a 3D image, corresponding to the location of the viewer, from 3D images at step S40. For example, this means that a 2D image corresponding to a corresponding angle may be extracted from a 3D image by considering a point where the viewer is placed and the extracted 2D image may be displayed. The generation of a 3D image is described in detail later with reference to a corresponding part.

If, as a result of the determination, the viewer is determined to be placed in a 3D-visible area, the control unit 180 may generate a 3D image and/or an image according to the state of the viewer at step S50. For example, it means that in the case of a child or an old person, a 3D effect may be lowered or a 3D image may be converted into a 2D image by considering the age of the viewer. The generation of an image according to the state of the viewer is described in detail later with reference to a corresponding part.

Figure 13:
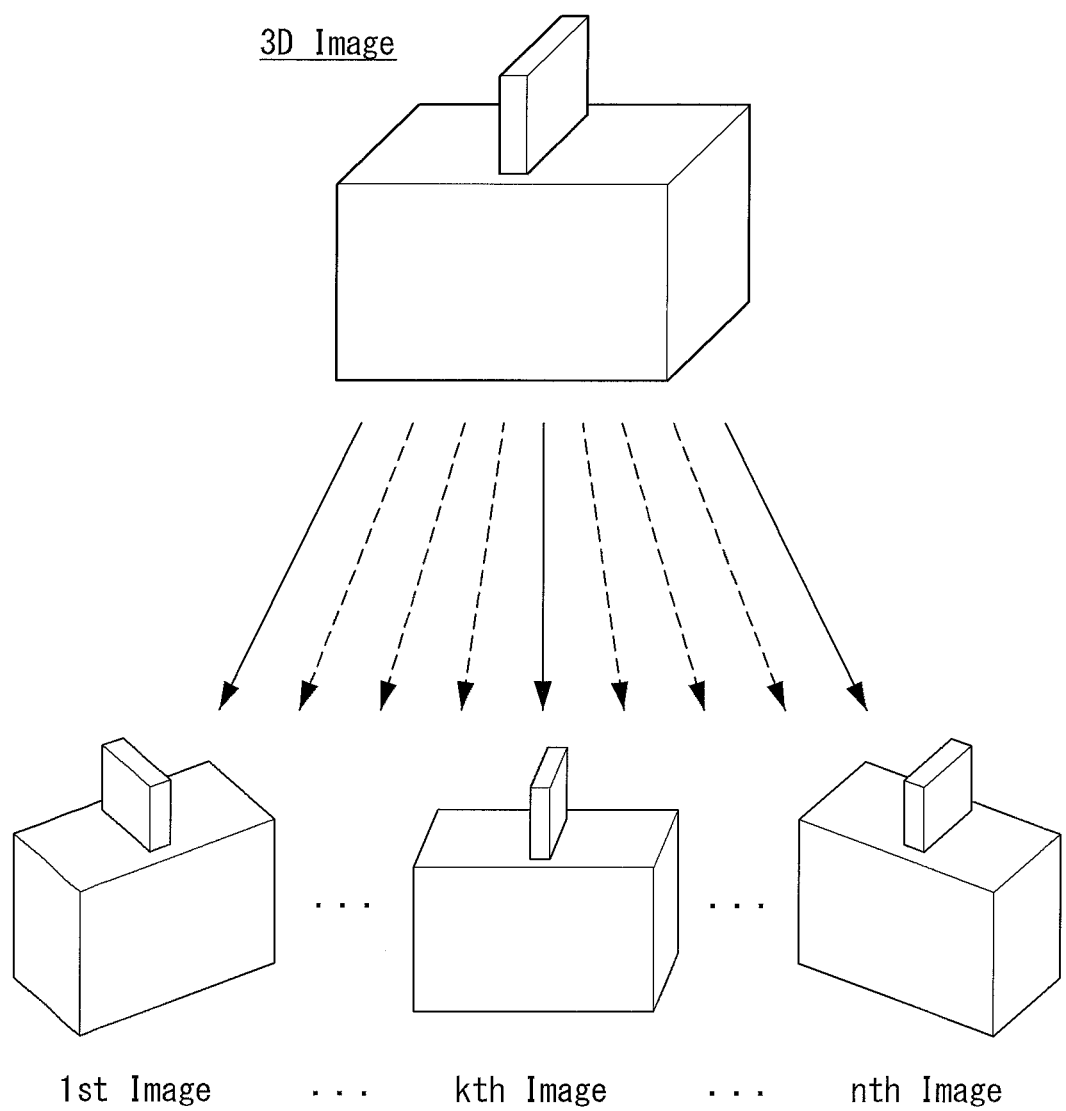
FIGS. 13 to 15 are diagrams illustrating a process of generating a 2D image corresponding to the location of a viewer in the operation of FIG. 12.
Figure 14:
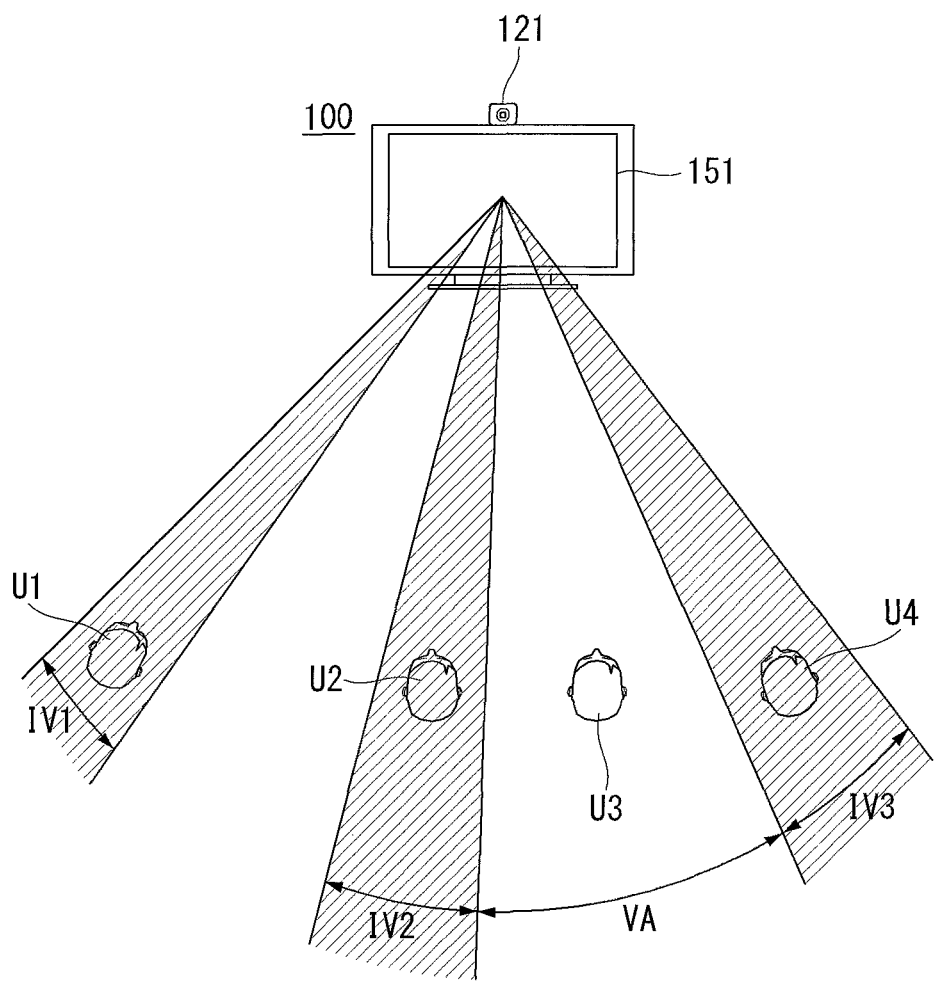
Figure 15:
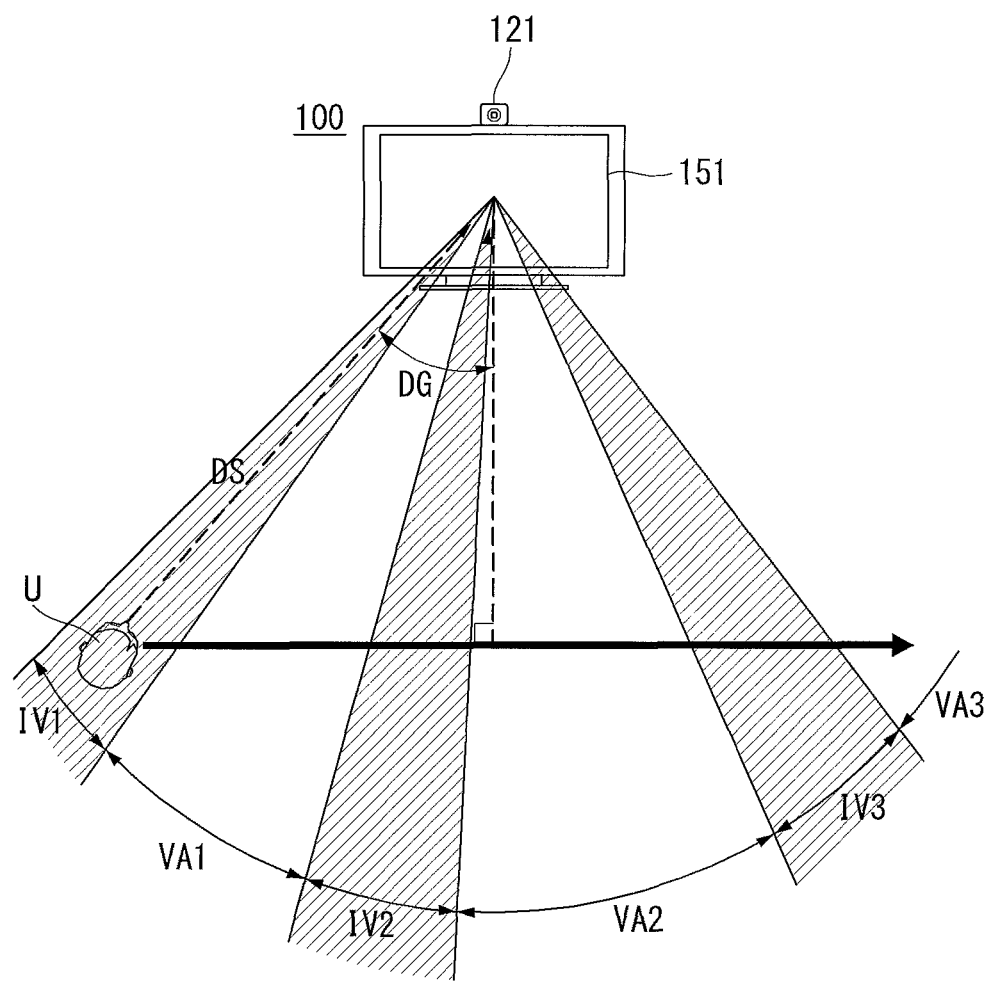

FIGS. 13 to 15 are diagrams illustrating a process of generating a 2D image corresponding to the location of a viewer in the operation of FIG. 12.

As illustrated in the drawings, the control unit 180 of the electronic device 100 according to an embodiment of the present invention may provide a viewer, placed in a 3D-invisible area, with a 2D image corresponding to a corresponding location.

As illustrated in FIG. 13, a 3D image may be a set of a plurality of 2D images. For example, the 3D image may include n 2D images having different photographing angles. The control unit 180 may view the n 2D images depending on the location of a viewer. For example, it means that a first 2D image may be seen when the viewer is placed on the left of a location that looks at the display unit 151, a k-th 2D image may be seen when the viewer is placed at the center of a location that looks at the display unit 151, and an n-th 2D image may be seen when the viewer is placed on the right of a location that looks at the display unit 151.

The 3D-visible area may be an area where an image of specific sequence can be clearly seen when the viewer is placed at that location. The 3D-invisible area may be an area where an image anterior to and/or posterior to an image of specific sequence is overlapped with the image of specific sequence and seen when the viewer is placed at the locations.

As illustrated in FIG. 14, a viewer may be placed at various locations on the basis of the electronic device 100. For example, first, second, and fourth viewers U1, U2, and U4 of the first to the fourth viewers U1 to U4 may be placed in respective 3D-invisible areas IV1 to IV3. If viewers are placed in the 3D-invisible areas IV1 to IV3, the viewers may not view sharp 3D images.

The control unit 180 may provide the viewers, placed in the 3D-invisible areas IV1 to IV3, with 2D images instead of 3D images. For example, the first viewer U1 may be provided with a first 2D image, the second viewer U2 may be provided with a k-th 2D image, and the fourth viewer U4 may be provided with an n-th 2D image. Since a 2D image corresponding to the location of a viewer is provided, the viewer can view a 2D image similar to a 3D image not an incomplete 3D image.

The control unit 180 may provide a 3D image to a third viewer U3 placed in a 3D-visible area VA.

As illustrated in FIG. 15, if viewers are placed in the 3D-invisible areas IV1 to IV3, the electronic device 100 may generate 2D images corresponding to corresponding locations. If viewers are placed in the 3D-visible areas VA1 to VA3, the electronic device 100 may generate 3D images. As described above, a viewer may view a first 2D image in the first 3D-invisible area IV1, may view a k-th 2D image in the second 3D-invisible area IV2, and may view an n-th 2D image in the third 3D-invisible area IV3. Meanwhile, 3D images may be viewed in the first 3D-visible area VA1, the second 3D-visible area VA2, and the third 3D-visible area VA3.

The control unit 180 may determine which image will be provided to a viewer U based on distance DS up to the viewer U and/or the angle DG of the viewer U for a specific point of the display unit 151.

The viewer U may view an image not having a sense of difference although the location of the viewer is changed. That is, this means that a sense of difference between a 2D image and a 3D image can be reduced although the 3D-invisible areas IV1 to IV3 intersect the 3D-visible areas VA1 to VA3 because 2D images that are suitable to be viewed at corresponding locations are displayed in the 3D-invisible areas IV1 to IV3.

FIGS. 16 to 21 are diagrams illustrating a process of generating an image according to the state of a viewer in the operation of FIG. 12.

As illustrated in the drawings, the electronic device 100 according to an embodiment of the present invention may generate a 3D image and/or an image according to the state of a viewer.

Figure 16:
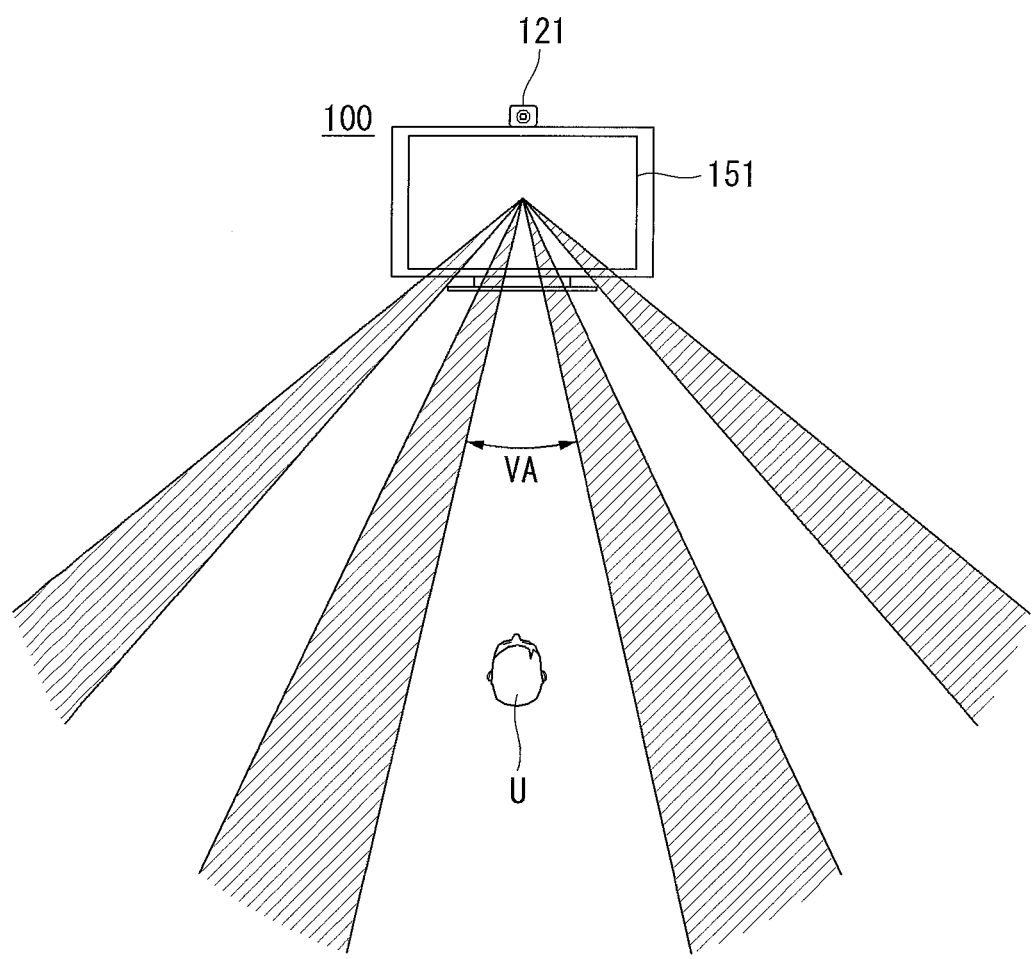
FIGS. 16 to 21 are diagrams illustrating a process of generating an image according to the state of a viewer in the operation of FIG. 12.

As illustrated in FIG. 16, a viewer U may be placed in a 3D-visible area VA. The control unit 180 may provide a 3D image to the viewer U placed in the 3D-visible area VA.

Figure 17:
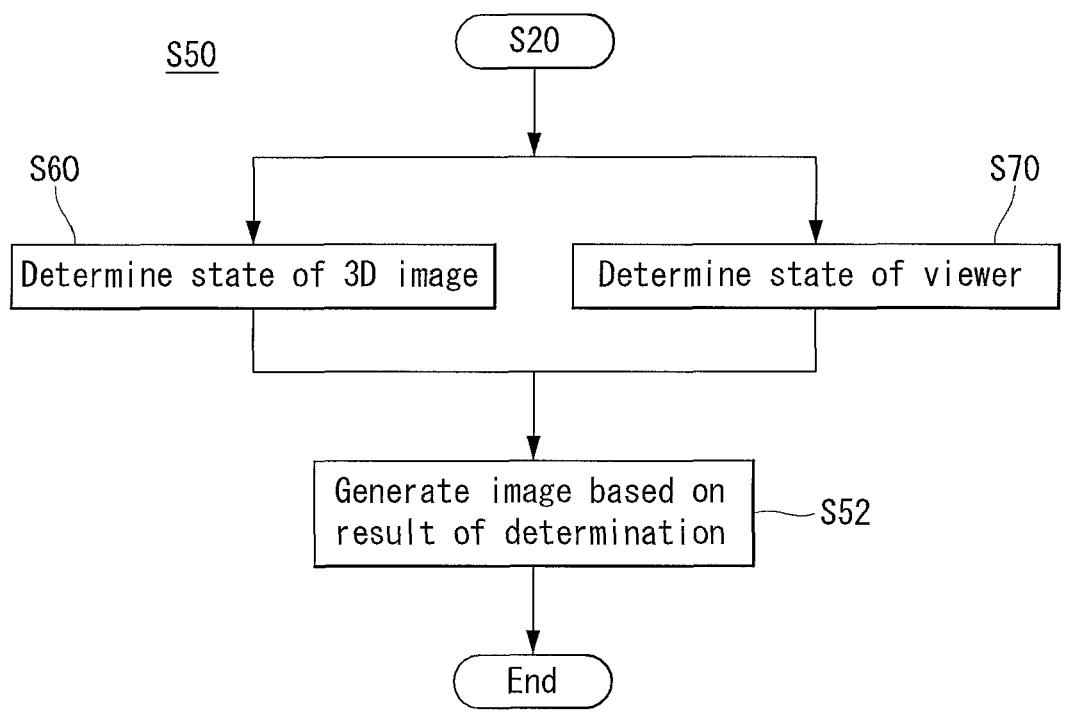

As illustrated in FIG. 17, generating a 3D image and/or an image according to the state of a viewer at step S50 may include determining the state of the 3D image at step S60 and determining the state of the viewer at step S70. Determining the state of the 3D image at step S60 and determining the state of the viewer at step S70 are described in detail with respect to corresponding parts.

After the state of the 3D image and/or the state of the viewer are determined, the control unit 180 may generate an image based on a result of the determination at step S52. That is, this means that the 3D image may be changed based on a result of the determination.

Figure 18:
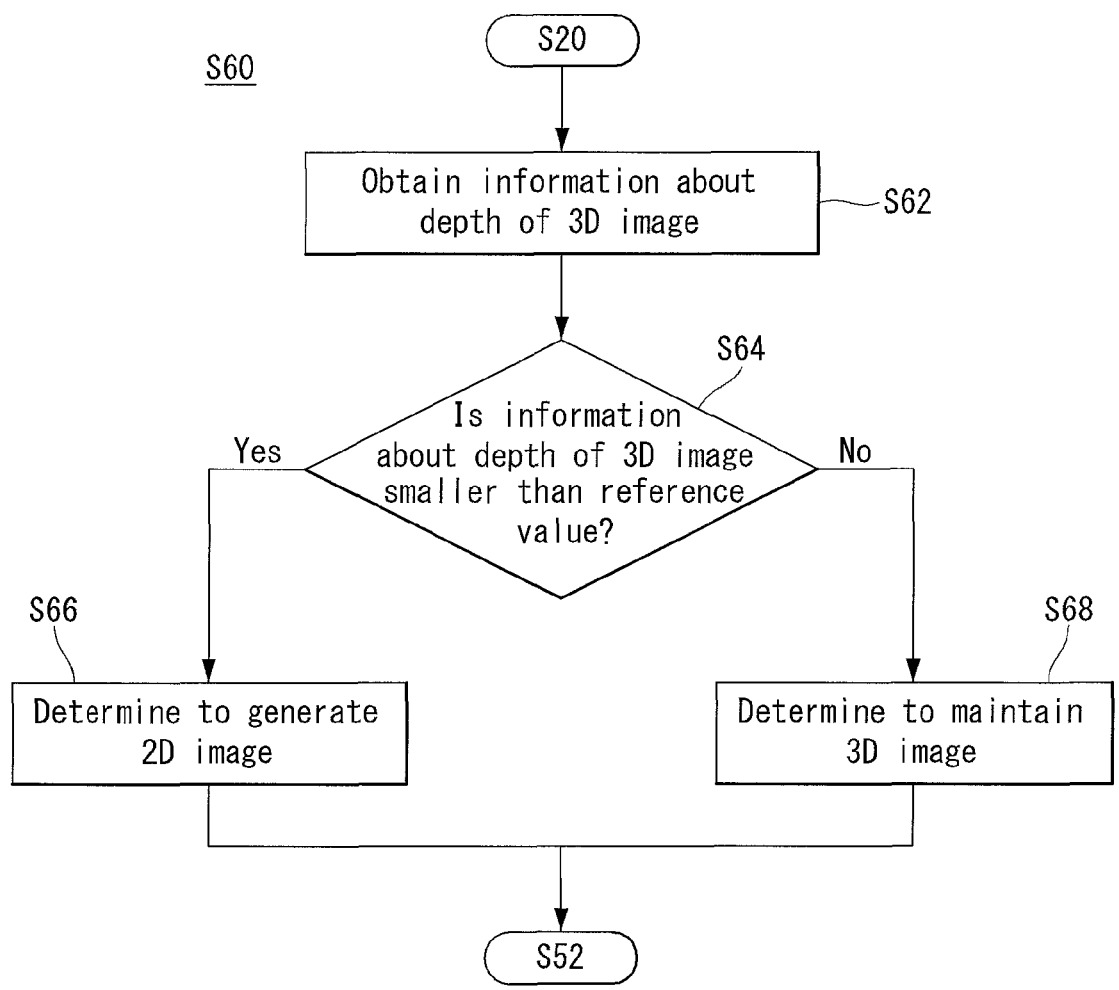

As illustrated in FIG. 18, determining the state of the 3D image at step S60 may include obtaining information about the depth of the 3D image at step S62.

The 3D image may include depth information. The depth information may be information about a front and rear relationship between objects included in the 3D image.

Whether or not the information about the depth of the 3D image is smaller than a reference value may be determined at step S64.

The 3D image may have a different 3D effect depending on a photographing environment, the type of photographed object, and the type of captured image. For example, if a specific object is photographed at close range, a 3D effect between the photographed specific object and a background object may be increased.

If the information about the depth of the 3D image is smaller than the reference value, a 3D effect may be relatively low.

If, as a result of the determination, the information about the depth of the 3D image is determined to be smaller than the reference value, the control unit 180 may determine to generate a 2D image at step S66. If, as a result of the determination, the information about the depth of the 3D image is determined to be not smaller than the reference value, the control unit 180 may determine to maintain the 3D image at step S68.

If the information about the depth of the 3D image is smaller than the reference value, the 3D image may have a relatively low 3D effect as described above. If the 3D image continues to be displayed although a 3D effect is low, a fatigue of a viewer may continue. For example, this means that if the viewer continues to view the 3D image having a low 3D effect, a fatigue of an eye of the viewer may be increased and dizziness may occur. Accordingly, if a 3D effect is low, the control unit 180 may generate a 2D image based on the 3D image. If a 3D effect is low, the 2D image may be displayed instead of the 3D image in order to reduce a fatigue of the viewer.

If the information about the depth of the 3D image is equal to or greater than the reference value, the control unit 180 may determine to maintain the 3D image. That is, this means that the 3D image may be displayed so that a 3D effect is generated.

Figure 19:
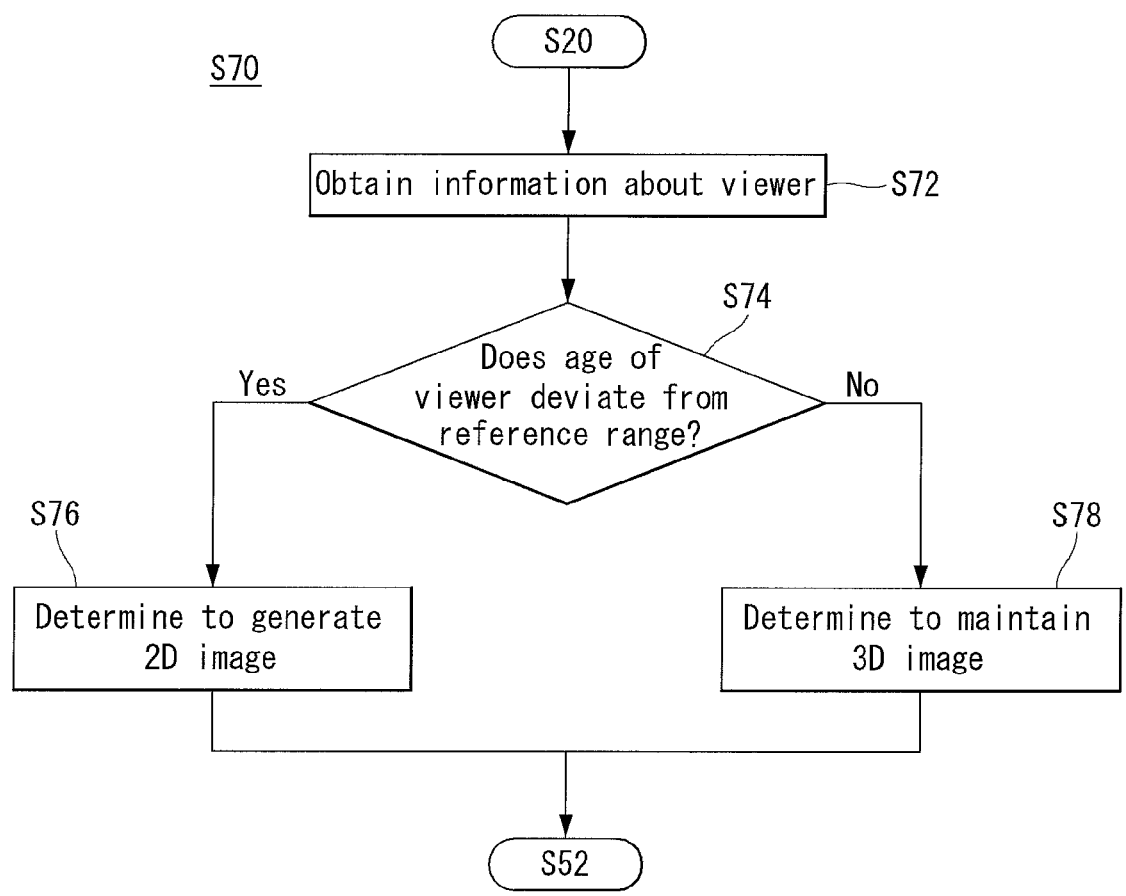

As illustrated in FIG. 19, determining the state of the viewer at step S70 may include obtaining information about the viewer at step S72.

The information about the viewer may include the age, height, and sex of the viewer. The information about the viewer may be obtained by analyzing an image captured by the camera 121. The analysis of the information about the viewer is described in detail with reference to a corresponding part.

The control unit 180 may determine whether or not the age of the viewer deviates from a reference range based on the obtained information about the viewer at step S74. The control unit 180 may determine to generate a 2D image at step S76 or to maintain the 3D image at step S78 based on a result of the determination.

If the age of the viewer is the age on which the viewer can properly view the 3D image, the viewer can comfortably experience a more realistic 3D effect. For example, if the age of the viewer deviates from the reference range, the viewer may experience dizziness when viewing the 3D image.

If the age of the viewer is very young or old, the control unit 180 may determine to generate a 2D image instead of a 3D image. That is, this means that the attributes of a displayed 3D image may be changed. That is, a more comfortable environment can be provided by displaying a 2D image based on a 3D image.

If the age of a viewer falls within a specific reference range, the control unit 180 may display a 3D image.

Figure 20:
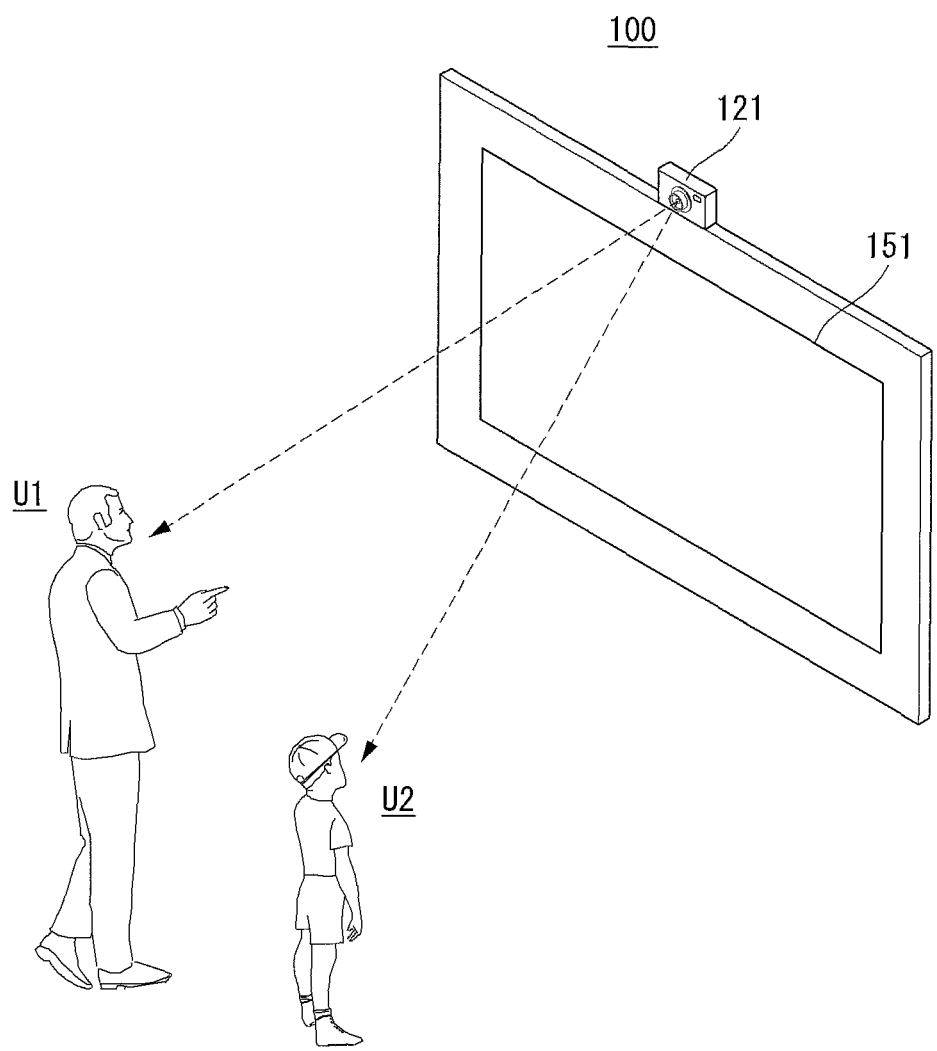

As illustrated in FIG. 20, the electronic device 100 according to an embodiment of the present invention may be equipped with the camera 121 capable of obtaining information about users U1 and U2.

The camera 121 may capture an image in front of the electronic device 100.

The image captured by the camera 121 may include the users U1 and U2 who watch the electronic device 100.

The control unit 180 may obtain information about the users U1 and U2 based on the captured image of the users U1 and U2. For example, this means that the control unit 180 may estimate the age of each of the users U1 and U2 or may directly measure the distance between the eyes of each of the users U1 and U2 based on the physical constitution of each of the users U1 and U2 extracted from the captured image.

The control unit 180 may change the attributes of a 3D image based on the obtained information about the user. For example, it means that a depth feeling of a stereoscopic image may be controlled greatly and/or small based on the measured distance between the eyes. Alternatively, the control unit 180 may convert a 3D image into a 2D image.

The number of users U1 and U2 may be plural. For example, it means that an adult and a child may watch the electronic device 100 at the same time. If the plurality of users U1 and U2 is present, the control unit 180 may change attributes, including a depth feeling of a stereoscopic image, based on a user having a younger age. That is, the electronic device 100 may operate based on a user having the shortest distance between both eyes. If the electronic device 100 operates based on a user having the shortest distance between both eyes, a child who views a stereoscopic image may not feel dizzy.

Figure 21:
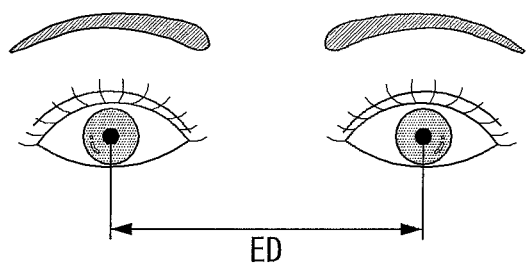

As illustrated in FIG. 21, the control unit 180 of the electronic device 100 according to an embodiment of the present invention may obtain a binocular distance ED, that is, distance between the eyes of a user.

The binocular distance ED may be obtained by analyzing each of images of the users U1 and U2 captured by the camera 121. For example, an image of a specific user U1 or U2 may be extracted from a captured image, and the location of the head may be extracted from the extracted image. Parts that are symmetrically dark in an image of the head may be determined to be both eyes. Furthermore, both eyes may be determined based on the fact that they are disposed between the forehead and a nose which are relatively bright.

The electronic device and the method of controlling the same according to the embodiments of the present invention are advantageous in that a viewer can smoothly view an image because the display state of a 3D image is changed if the viewer is placed in a 3D-invisible area.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising:
a sensor configured to detect a location of at least one viewer;
a display configured to display a three-dimensional (3D) image, and the display to provide at least one 3D-visible area and at least one 3D-invisible area, the 3D-visible area being an area where a 3D image is to be recognized by a viewer and the 3D-invisible area being an area where a 3D image is not to be recognized by a viewer;
a controller configured to change a display state of a displayed image when the viewer is detected to be at the 3D-invisible area, and wherein the controller is configured to provide a two-dimensional (2D) image corresponding to a location of a viewer provided at the 3D-invisible area such that the display state of the image is changed to a 2D state.

2. The electronic device of claim 1, wherein the controller is configured to display, on the display, at least one indicator, the at least one indicator being indicative of at least one of the location of the viewer, a location of the 3D-visible area, and a direction along which the viewer is to move to the 3D-visible area so the controller to change the display state of the displayed image.

3. The electronic device of claim 2, wherein the controller is configured to superimpose the indicator on the 3D image, and to display, on the display, the superimposed indicator and the 3D image.

4. The electronic device of claim 1, wherein the controller is configured to provide at least one 2D image, corresponding to the location of the viewer, from the 3D image.

5. The electronic device of claim 1, wherein the controller is configured to display the 2D image when the location of the viewer is detected to be at the 3D-invisible area, and the controller is configured to display the 3D image when the location of the viewer is detected to be at the 3D-visible area.

6. The electronic device of claim 1, wherein the controller is configured to provide a two-dimensional (2D) image from the 3D image based on information regarding a depth of the 3D image and to display the 2D image on the display.

7. The electronic device of claim 6, wherein the controller is configured to provide the 2D image when a 3D effect of the 3D image is smaller than a reference value based on the depth information.

8. The electronic device of claim 1, wherein the controller is configured to change the display state of the displayed image based on information regarding the at least one viewer.

9. The electronic device of claim 8, wherein:
the information regarding the viewer includes information regarding an age of the viewer, and
the controller is configured to change attributes of the displayed image based on the information regarding the age of the viewer.

10. The electronic device of claim 1, wherein:
the sensor includes a camera configured to obtain an image, and
the controller is configured to obtain an image of the viewer from the image obtained by the camera.

11. An electronic device, comprising:
a sensor configured to detect at least one viewer;
a display configured to provide a three-dimensional (3D) image and to provide at least one 3D-visible area where a 3D image is to be recognized by a viewer and at least one 3D-invisible area where a 3D image is to not be recognized by a viewer; and
a controller configured to display, on the display, at least one indicator to guide the viewer to the 3D-visible area when the viewer is detected to be at the 3D-invisible area, wherein the controller is configured to provide a two-dimensional (2D) image corresponding to a location of a viewer provided at the 3D-invisible area such that the display state of the displayed image is changed.

12. The electronic device of claim 11, wherein the controller is configured to display the 2D image when the location of the viewer is detected to be at the 3D-invisible area, and the controller is configured to display the 3D image when the location of the viewer is detected to be at the 3D-visible area.

13. The electronic device of claim 11, wherein the controller is configured to provide a two-dimensional (2D) image from the 3D image based on information regarding a depth of the 3D image and to display the 2D image on the display.

14. The electronic device of claim 11, wherein the controller is configured to change the display state of the displayed image based on information regarding the at least one viewer.

15. A method of controlling an electronic device, comprising:
displaying a three-dimensional (3D) image on a display;
determining a location of at least one viewer relative to the electronic device, the location including at least one 3D-visible area where a 3D image is to be seen by a viewer and at least one 3D-invisible area where an image is to not be recognized as a 3D image by a viewer;
changing a display state of the 3D image when the viewer is determined to be at the 3D-invisible area, and wherein changing the display state of the 3D image includes providing a two-dimensional (2D) image corresponding to a location of a viewer provided at the 3D-invisible area such that the display state of the 3D image is changed to a 2D state.

16. The method of claim 15, wherein changing the display state of the 3D image includes displaying, on the display, at least one indicator, the at least one indicator being indicative of at least one of the location of the viewer, a location of the 3D-visible area, and a direction along which the viewer is to move to the 3D-visible area such that the display state of the 3D image is changed.

17. The method of claim 15, wherein the 2D image is displayed when the location of the viewer is determined to be at the 3D-invisible area, and the 3D image is displayed when the location of the viewer is determined to be at the 3D-visible area.

18. The method of claim 15, wherein changing the display state of the 3D image includes providing a two-dimensional (2D) image from the 3D image based on information regarding a depth of the 3D image and displaying the 2D image.

19. The method of claim 15, wherein changing the display state of the 3D image includes changing the display state of the 3D image based on information regarding the at least one viewer.

* * * * *